United States Patent [19]
Weichman et al.

[11] Patent Number: 5,967,574
[45] Date of Patent: Oct. 19, 1999

[54] APPARATUS AND METHOD FOR SEARCHING POCKETS AND CREVICES

[76] Inventors: Henry J. Weichman, 9531 White Oak Ave., Munster, Ind. 46321; Sam R. Miele, 17117 Warbler La., Orland Park, Ill. 60462

[21] Appl. No.: 09/086,397

[22] Filed: May 28, 1998

Related U.S. Application Data

[63] Continuation of application No. 08/780,667, Jan. 7, 1997, Pat. No. 5,765,887.

[51] Int. Cl.⁶ .................................................. B25J 1/00
[52] U.S. Cl. ............................................................. 294/1.1
[58] Field of Search ................................... 294/1.1, 65.5; 15/104.002; 271/33

[56] References Cited

U.S. PATENT DOCUMENTS

| | | | |
|---|---|---|---|
| 3,040,352 | 6/1962 | Vian | 15/104 |
| 3,797,875 | 3/1974 | den Hamer | 294/1 |
| 4,600,227 | 7/1986 | Ennis et al. | 294/1.1 |
| 4,653,789 | 3/1987 | McWilliams et al. | 294/1.1 |
| 4,979,257 | 12/1990 | Heneveld | 15/104 |
| 5,161,842 | 11/1992 | Beeler | 294/1.1 |
| 5,251,943 | 10/1993 | Dalbo et al. | 294/1.1 |
| 5,273,329 | 12/1993 | Wessel | 294/61 |
| 5,470,116 | 11/1995 | DeWoskin | 294/1.1 |
| 5,556,150 | 9/1996 | Ampel | 294/118 |

OTHER PUBLICATIONS

Advertisement: "The Ampel Probe", LEPN, Nov.–Dec. 1996.

*Primary Examiner*—Dean J. Kramer
*Attorney, Agent, or Firm*—Brinks Hofer Gilson & Lione

[57] ABSTRACT

A method and a probing implement for facilitating searches of hidden areas, such as inside pants pockets, under collars, or under belts is disclosed herein. The probing implement includes an elongated body with a handle portion at one end, a tacky portion at the other end, and a cover enveloping at least the tacky portion. The method includes removing the cover from the tacky portion of probing implement, grasping the probing implement by the handle portion, inserting at least the tacky portion of the probing implement into a recessed area of clothing, moving the probing implement within recessed area so that tacky portion has an opportunity to contact and adhere to any hidden objects, withdrawing the probing implement from the recessed area, and either disposing of the probing implement or placing the probing implement along with any attached objects into an evidence bag. In an alternative method, the covered tacky portion of the implement may be inserted into the recess and the cover subsequently withdrawn while the implement is within the recess.

3 Claims, 3 Drawing Sheets

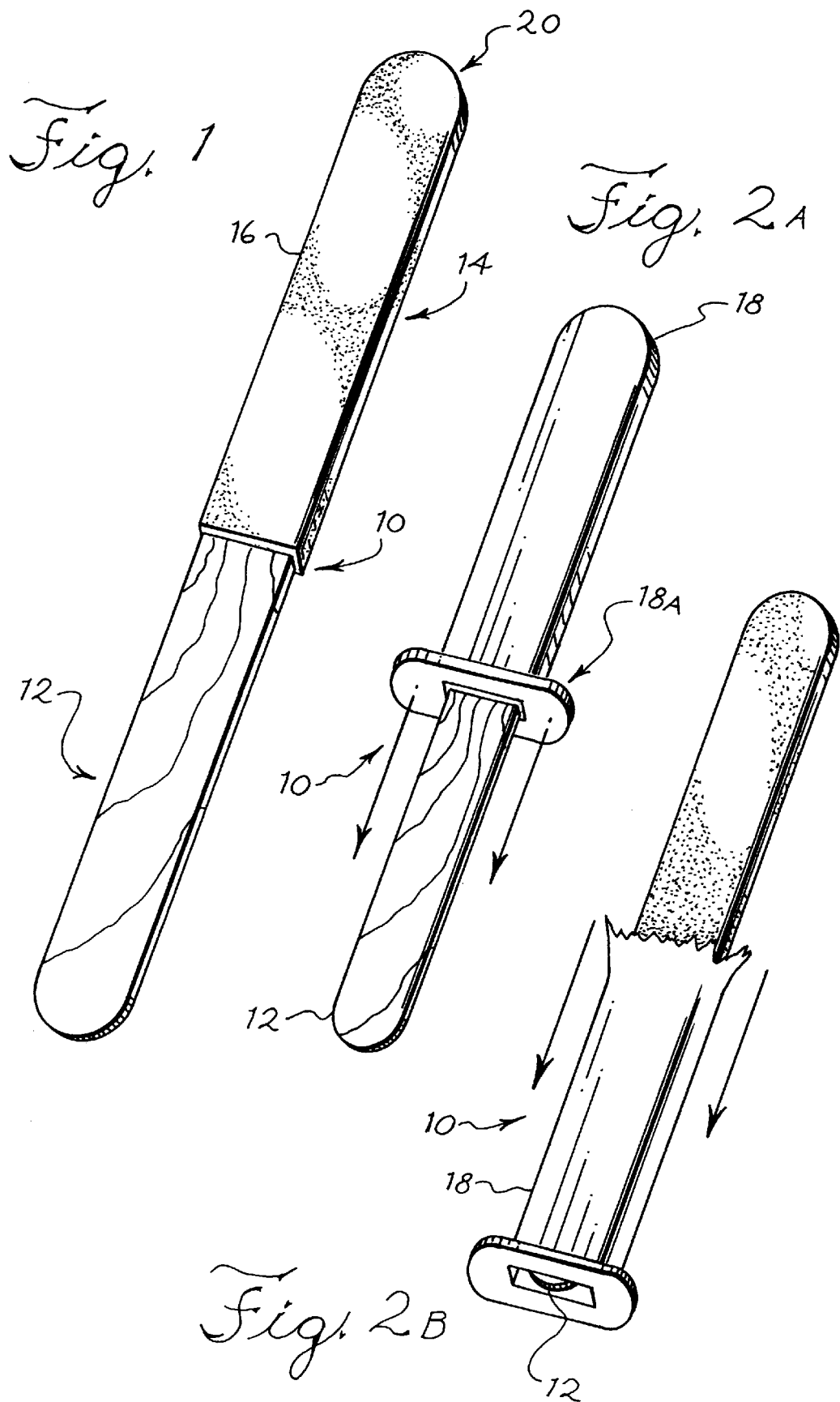

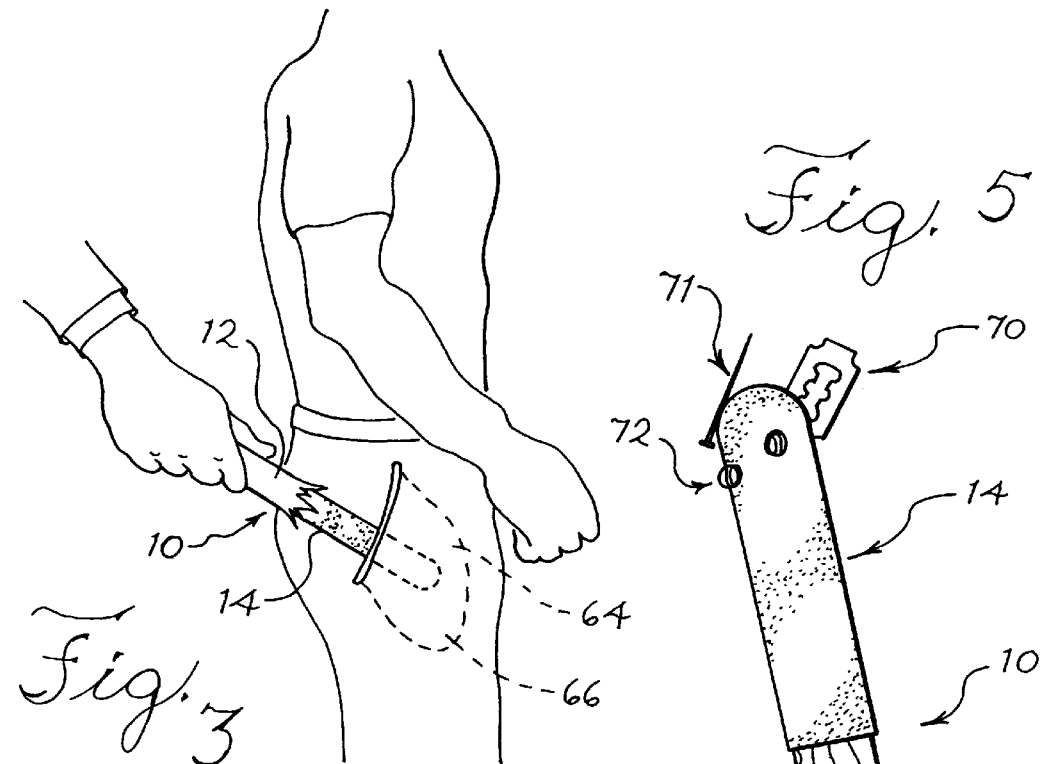
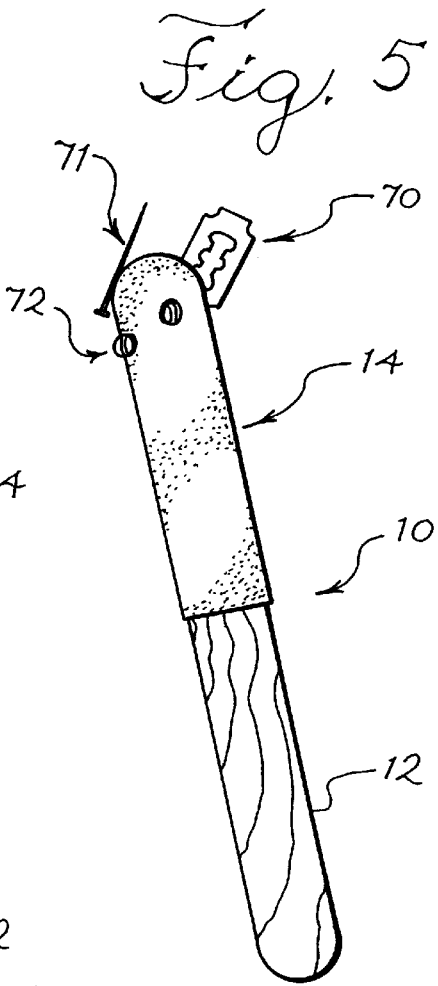
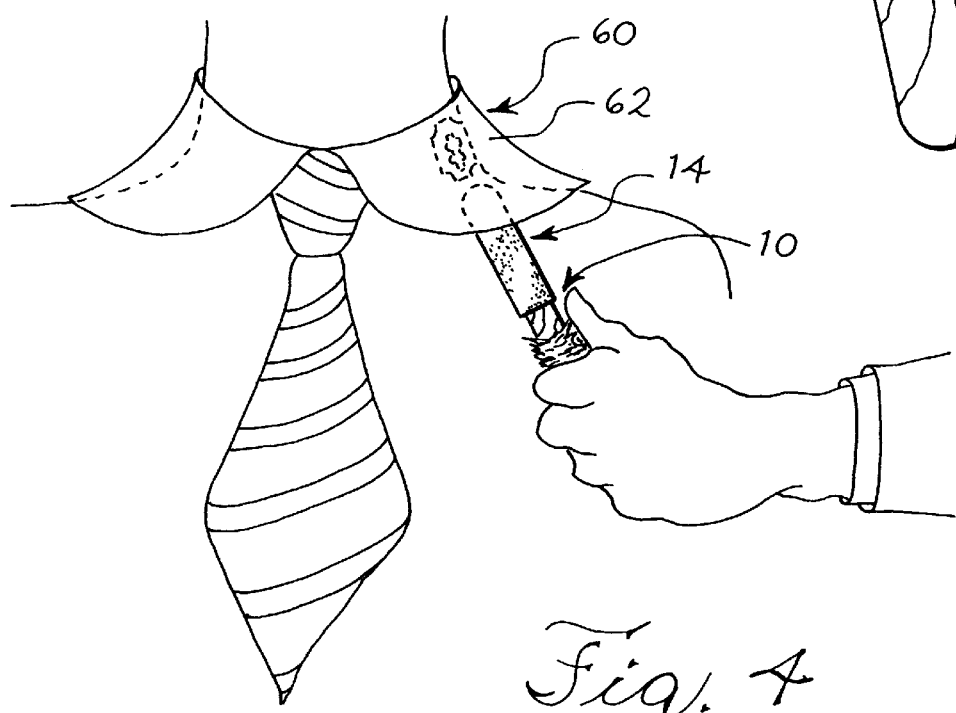

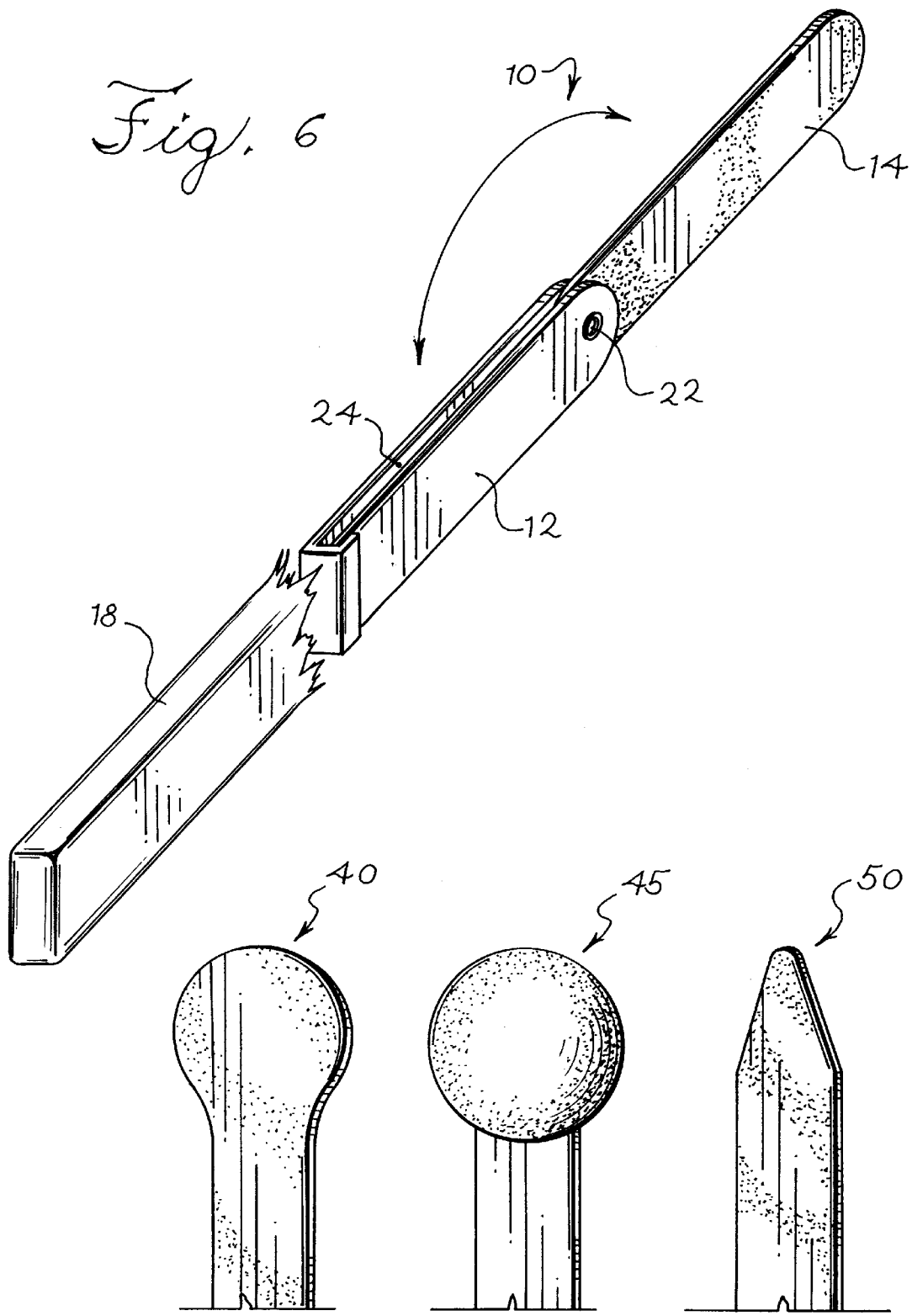

APPARATUS AND METHOD FOR SEARCHING POCKETS AND CREVICES

This application is a continuation of U.S. application Ser. No. 08/780,667, filed Jan. 7, 1997, now U.S. Pat. No. 5,765,887.

BACKGROUND OF THE INVENTION

The invention relates to searching devices, particularly to a probing implement for facilitating searches of recessed or creviced areas, notably the insides of pockets and under collars of people taken into custody, and other searchable crevices, such as car seats or bags. The probing implement is preferably disposable and can be used without specialized skill or dexterity, and it affords the user protection from potentially dangerous objects which could be contained in these hidden areas, such as razor blades, drugs or infected hypodermic needles.

When a person is taken into custody, it is customary for a police officer to "pat down" the subject with his bare hands to search for and remove objects from pockets or clothing. Occasionally, subjects taken into custody carry potentially dangerous, sharp objects, such as razor blades, needles and knives in their pockets or attempt to hide objects from the police. Also, powdery substances, such as drugs, may not be palpable by the hands. Police officers are then faced with the unnecessary risk of encountering such dangerous objects or substances with their bare hands. If the police officer chooses to wear gloves to protect himself while conducting the search, the officer may involuntarily overlook a hidden object because the sense of feel is dampened when the hand is encased in a glove. Moreover, even heavy gloves cannot totally abrogate the possibility of puncture wounds sustained upon an unexpected encounter with a sharp object such as a hypodermic needle. The possibility that a hypodermic needle, knife or razor may be a harbor for HIV or other serious disease greatly compounds the potential health threat to the searcher associated with these routine and necessary searches.

Tools for facilitating drug searches have been described in the prior art. One such device, shown in U.S. Pat. No. 5,161,842, has an angled handle attached to a searching end which has an internal recess to collect small, loose objects encountered as a police officer searches through crevices between furniture or vehicle seat cushions. However, because that device relies on a directional orientation of the internal recess and the ability of the loose objects to fit inside the recess, it may fail to uncover all of the small, potentially dangerous objects found in clothing recesses. For example, it may be possible for the bottom of the drug tool to contact a needle within the close confines of a pocket, but because of the geometry of the location of the drug tool's recess, the needle may not be sufficiently displaced to enter the drug tool's recess. Additionally, the size and shape of the drug tool may hamper an officer's attempt to use the tool in searching relatively confined areas, such as in pants pockets, under collars, and under belts.

Other devices designed for picking up small objects utilize a tacky adhesive to adhere the object to the device. These devices require manual manipulation of an adhesive substance to a portion of the tool before the tool is ready for operation. The need for excessive physical manipulation to use such devices and the requirement of an additional source of adhesive may make these devices unsuitable for use by police officers who often conduct searches under pressures and confines that would prohibit undue manipulation of search devices. Additionally, other gripping devices may have a relatively small adhesive surface area that rapidly may become clogged with dust, lint, or dirt commonly found in pockets. Furthermore, devices displaying relatively small adhesive surface areas may be less effective in adhering to and retrieving potentially dangerous objects from hidden recesses.

One object of the present invention is to provide a cost-effective, disposable tool to quickly, easily, and safely conduct searches of clothing recesses and other crevices.

Another object of the present invention is to provide a probing implement that will maximize the probability that small, elusive objects, such as hypodermic needles, razor blades, or powdery substances can be safely removed from hidden recesses of clothing.

Still another object of the present invention is to provide a probing implement that will allow recovery of small quantities of powdery substances, such as drugs from hidden recesses. The substances will adhere to the tacky portion the probing implement for later use as evidence. Without the use of the probing implement, powdery substances that an officer's hand would encounter may be lost, displaced, or destroyed.

SUMMARY OF THE INVENTION

To address the above concerns, the present invention provides a probing implement and a method for facilitating body or crevice searches. The probing implement is designed to be disposable and economical to manufacture. The probing implement is preferably hand-held and has a handle portion at one end and a tacky portion at the other end. In the preferred embodiment, a cover envelops at least part of the tacky portion of the implement. When the probing implement is in use, the cover can be moved to a position away from the tacky portion, which may include a position coincident with the handle portion.

During use, the tacky portion of the probing implement is exposed and inserted into a hidden clothing recess, such as inside a pocket, under a collar, or under a belt. The probing implement is manipulated inside the recess so that the tacky portion has the opportunity to contact and adhere to any objects located within the recess, including hypodermic needles, razor blades, or powdery substances. After the implement is withdrawn from the recessed area, it may be safely disposed of, or deposited, along with the adhered objects, into an evidence bag for use by the appropriate authorities.

It is to be understood that both the foregoing general description and the following detailed description are exemplary and explanatory and are intended to provide further explanation of the invention as claimed. The invention, together with the further objects and attendant advantages, will best be understood by reference to the following detailed description, taken in conjunction with the accompanying drawings.

DESCRIPTION OF DRAWINGS

FIG. 1 is a perspective view of one embodiment a probing implement according to the present invention.

FIGS. 2A and 2B are perspective views of the probing implement of FIG. 1 with the cover on, and with the cover retracted over the handle, as the probing implement would likely be found immediately prior to use.

FIG. 3 is a perspective view showing the probing implement of FIG. 1 being used to search a pants pocket.

FIG. 4 is a perspective view showing the probing implement of FIG. 1 being used to search underneath a collar.

FIG. 5 is a perspective view of the probing implement of FIG. 1 including exemplary retrieved objects.

FIG. 6 is a perspective view of another embodiment of a probing implement of the present invention.

FIG. 7 shows a variety of tip shapes which may be incorporated into the present invention.

DETAILED DESCRIPTION OF THE PRESENTLY PREFERRED EMBODIMENTS

A preferred embodiment of hand-held probing implement 10 of the present invention is shown in FIG. 1. The probing implement 10 is designed for use during searches of subjects taken into custody, particularly by police officers as they search in pockets, under collars, and in other areas where potentially hazardous objects may be hidden. Preferably, the probing implement 10 has an elongated handle portion 12 at one end, and a tacky portion 14 at the other end, which causes small items, such as needles or razor blades, to adhere to the probing implement 10. Located at the distal end of the tacky portion 14 is a tip 20. The tip 20 of the tacky portion 14 may take a variety of shapes. For example, the tip 20 may be of a pointed shape to allow access to secluded areas of pocket recesses. Alternatively, the tip 20 may be formed in a tear-drop shape, which will increase the surface area of the adhesive 16 available for probing recesses and increase the likelihood that hidden, potentially dangerous objects are discovered.

In the preferred embodiment, the handle portion 12 is generally cylindrical or flat and fits comfortably within the user's hand. The tacky portion 14 of the implement 10 is also generally cylindrical or flat, and is coated with a layer of adhesive 16. Preferably, the adhesive 16 has a consistency that facilitates cohesion of small, light-weight objects to the tacky portion 14 of the implement 10. The viscosity of the adhesive 16 is preferably such that the adhesive tends to remain associated with the tacky portion 14 of the implement 10 during the search and does not transfer to the particular area being searched. The adhesive 16 is preferably of a type that is not fully cured so that objects that the probing implement 10 encounters will adhere to the tacky end 14 of the probing implement 10 and not remain permanently adhered thereto. The adhesive 16 is also pressure-sensitive so that only a minimal amount of pressure is necessary to ensure adherence. An adhesiveness similar to that of duct tape or masking tape has been found to be effective.

FIG. 2 depicts the probing implement 10 with the tacky portion 14 encased by a cover 18. Preferably, the cover 18 envelops the tacky portion 14 and protects the tacky portion 14 from exposure until it is needed by the user. The cover 18 is preferably non-sticky, and may be fashioned from waxed paper or lightweight cardboard lined on its interior with a non-stick surface. In the alternative, the cover 18 may envelop primarily the tacky portion 14, or the entire probing implement 10. When the cover 18 is removed, the tacky portion 14 of the probing implement 10 is exposed, and the implement 10 may then be used to conduct searches.

The probing implement 10 is preferably designed to be entirely disposable after each use through the use of lightweight, inexpensive materials. Additionally, the probing implement 10 is shaped so that it may be easily manipulated with one hand. To uncover the portion 14, the user may grasp the probing implement 10 by the cover with the handle 12 facing toward the user's body. The user then thrusts the handle portion of the probing implement toward the user's thigh or leg, which upon contact, will cause the tacky portion 14 to pierce through the top of the cover 18. The cover 18 then becomes associated with the handle 12 and the probing implement 10 is ready for use. Alternatively, a more conventional method of removing the cover 18 with one hand while the other hand holds the handle 12 may be employed.

After the tacky portion 14 is exposed, the user may safely insert the tacky portion 14 of the probing implement 10 into recessed areas of the retained person's clothing, notably inside pockets, under shirt or jacket collars, inside cuffs, or under belts. As shown in FIG. 3, for example, tacky portion 14 may be inserted into pants pocket 64 and manipulated over the inside of the pocket lining 66. Similarly, the recess 62 behind a shirt collar 60 may be effectively searched, as shown in FIG. 4. Retrieved objects 70–72 from these recesses, as shown in FIG. 5, will adhere sufficiently to the tacky portion 14 of implement 10.

In the alternative, the user may thrust the implement 10 into a recessed area with the cover 18 intact. Once the implement 10 is inserted, the user can pull back the cover to interiorly expose the tacky portion to assist in this operation, pull grips 18A may be added to cover 18. Using the probing implement 10, the user may quickly probe hidden, recessed areas to retrieve potentially hazardous objects or, additionally, discover and sample powdery substances such as drugs. Recovered objects, together with the probing implement 10, may then be placed into an evidence bag and saved.

The probing implement 10 of the preferred embodiment is preferably 8 to 12 inches long. The tacky portion 14 encompasses approximately ½ the length of the probing implement. The adhesive 16 is coated on the tacky portion to a depth of approximately 0.125 inches.

In another embodiment of the present invention shown for example in FIG. 6, the tacky portion 14 may be joined to the handle portion 12 at a hinge 22. In this embodiment, the handle portion 12 is essentially the same as described above except that the handle portion 12 defines a hollow area 24, which houses the tacky portion 14 when the probing implement 10 is in a retracted, storage state. The cover 18 envelops the entire probing implement 10. When a user desires to use the probing implement 10, the cover 18 is removed using either method described above. After the cover 18 is removed from the probing implement 10, the handle 12 is grasped in one hand, and with an abrupt motion of the hand away from the user's hand, the tacky portion 14 is caused to leave its hollow area 24 within the handle 12, rotate about the hinge 22 and achieve an extended position which is then suitable for conducting a search in the same manner as described above. Upon completion of the search, the probing implement 10 and the contents adhering to it may be deposited in an evidence bag for safe-keeping.

As shown in FIG. 7, various tip shapes may be used to optimize the effectiveness of the implement for particular uses. For example, a flat tip 40 may be formed in the tacky portion to facilitate searching in narrow crevices such as under belts and collars. Around ball-like tip 45 may be used to search large pockets, and a pointed tip 50 may be used to search very small, delicate areas such as shirt pockets or coin purses.

It is intended that the foregoing detailed description be regarded as illustrative rather than limiting. For example, the overall shape of the implement and various portions of it may be other than an elongated cylinder. Thus, the implement may fully or partially have an oblong or rectangular cross-section. Furthermore, the shape of the handle and the materials used for the implement or the cover may vary according to various advantages using such materials. It is therefore understood that the following claims, including all equivalents, are intended to define the scope of the invention.

We claim:

1. A hand-held probing implement comprising:

an elongated body having a tacky portion and a handle portion, said handle portion including a non-tacky surface and adapted to fit within the hand; and a cover encasing at least part of said tacky portion of said implement, said cover movable to expose at least part of said tacky portion, said cover being deformable to allow grasping of said handle portion through said cover, said cover movable from a first position that envelopes at least the tacky portion of the probing implement, to at least a second position that envelopes at least part of a handle portion of the probing implement thereby exposing at least part of the tacky portion of the probing implement.

2. A method of searching recesses in clothing, said method comprising the steps of:

providing a hand-held probing implement having an elongated body, said body including a tacky portion with a tip at one end, and a handle portion;

providing a deformable cover encasing at least part of said tacky portion of said probing implement;

grasping said deformable cover and said implement through said cover;

displacing said cover toward said handle portion to deform said cover and exposing at least part of said tacky portion;

inserting said tacky portion of said probing implement into at least one of said recesses; and retrieving said tacky portion of said probing implement from said recess.

3. The method as recited in claim 2 further comprising the steps of:

contacting at least part of the tacky portion of the probing implement with an inside portion of at least one recess;

moving the tacky portion of the probing implement within the recess; and urging the tacky portion of the probing implement against a desired object located within the recess.

* * * * *